United States Patent
Wood et al.

(10) Patent No.: US 7,196,503 B2
(45) Date of Patent: Mar. 27, 2007

(54) CURRENT AVERAGING CIRCUIT FOR A PWM POWER CONVERTER

(75) Inventors: Grady M. Wood, Satellite Beach, FL (US); Fred F. Greenfeld, Satellite Beach, FL (US)

(73) Assignee: Intersil Americas, Inc., Milpitas, CA (US)

( * ) Notice: Subject to any disclaimer, the term of this patent is extended or adjusted under 35 U.S.C. 154(b) by 209 days.

(21) Appl. No.: 11/087,229

(22) Filed: Mar. 23, 2005

(65) Prior Publication Data

US 2006/0017424 A1 Jan. 26, 2006

Related U.S. Application Data

(60) Provisional application No. 60/591,227, filed on Jul. 26, 2004.

(51) Int. Cl.
*G05F 1/569* (2006.01)
*H02M 3/335* (2006.01)
*H02H 7/122* (2006.01)

(52) U.S. Cl. .............. 323/276; 323/285; 323/908; 363/17; 363/56.03

(58) Field of Classification Search .......... 323/273, 323/274, 275, 276, 283, 284, 285, 908; 363/17, 363/49, 56.02, 56.03, 56.07, 56.1
See application file for complete search history.

(56) References Cited

U.S. PATENT DOCUMENTS

| | | | |
|---|---|---|---|
| 3,701,937 A | 10/1972 | Combs | |
| 4,587,604 A | 5/1986 | Nerone | |
| 4,761,702 A | 8/1988 | Pinard | |
| 6,343,026 B1 * | 1/2002 | Perry | .......... 363/65 |
| 6,737,845 B2 * | 5/2004 | Hwang | .......... 323/284 |
| 6,906,500 B2 * | 6/2005 | Kernahan | .......... 323/225 |
| 2002/0101224 A1 | 8/2002 | Rozsypal | |
| 2003/0080723 A1 | 5/2003 | Chen et al. | |

* cited by examiner

*Primary Examiner*—Jessica Han
(74) *Attorney, Agent, or Firm*—Gary R Stanford (57) ABSTRACT

A current averaging circuit for averaging a piecewise linear switching current waveform of a PWM power converter including first, second and third sample and hold circuits and a sample averaging circuit. The first sample and hold circuit samples a short duration of the current waveform for each PWM cycle and provides corresponding short samples. The second sample and hold circuit samples a long duration of each PWM cycle and provides corresponding long samples. The sample averaging circuit is coupled to the first and second sample and hold circuits, averages corresponding ones of the short and long samples and provides corresponding average values. The third sample and hold circuit samples each average value and provides a current average signal. The waveform may include ramp-on-a-step voltage pulses representing switching current. The current average signal is updated after each current pulse.

20 Claims, 6 Drawing Sheets

CURRENT AVERAGING CIRCUIT FOR A PWM POWER CONVERTER

CROSS-REFERENCE TO RELATED APPLICATIONS

This application claims the benefit of U.S. Provisional Application No. 60/591,227 filed on Jul. 26, 2004, which is herein incorporated by reference for all intents and purposes.

BACKGROUND OF THE INVENTION

1. Field of the Invention

The present invention relates to PWM power controllers, and more particularly to an integrated average current limit and control for a PWM power supply.

2. Description of the Related Art

The current in the switching devices of pulse-width modulation (PWM) control circuitry has the characteristic shape of a ramp or ramp-on-a-step due to one or more output inductors. The current is converted to a voltage by either a small resistor in series with the source in the primary or by a current transformer or other transducer mechanism. The voltage waveform has historically been either integrated external to or peak detected on the controller chip. The resulting voltage information is then used to provide either current mode feedback information or current limiting information or, in some cases, both. In some applications, it is desirable to provide either the current limiting or current feedback function based on the average value of the ramp-on-a-step waveform. Conventional methods estimate the average value based on the sampled peak value. Such conventional techniques, however, are inaccurate and cause current tail-out.

SUMMARY OF THE INVENTION

A current averaging circuit for averaging a piecewise linear switching current waveform of a pulse width modulation (PWM) power converter includes first, second and third sample and hold circuits and a sample averaging circuit. The first sample and hold circuit samples a short duration of the current waveform at a start of each PWM cycle and provides corresponding short samples. The second sample and hold circuit samples a long duration of each PWM cycle and provides corresponding long samples. The sample averaging circuit is coupled to the first and second sample and hold circuits, averages corresponding short and long samples and provides corresponding average values. The third sample and hold circuit samples each average value and provides a current average signal.

The first, second and third sample and hold circuits may each include a switch coupled to a capacitor. Each sample and hold circuit may further include a buffer having an input coupled to a corresponding capacitor and an output providing sampled values. The current averaging circuit may include a timing control circuit that controls the switch of each sample and hold circuit. In one embodiment, the timing control circuit provides a short control signal to a first switch of the first sample and hold circuit, a long control signal to a second switch of the second sample and hold circuit, and an average control signal to a third switch of the third sample and hold circuit. The piecewise linear switching current waveform may include ramp-on-a-step pulses, where the timing control circuit provides the short control signal as a short pulse at a start of each current waveform pulse, provides the long control signal as a long pulse for a duration of each current waveform pulse, and provides the average control signal as a short pulse at an end of each current waveform pulse. The sample averaging circuit may include a resistive differencing junction coupled to a capacitor.

A power converter according to an embodiment of the present invention includes an inductive device, a switching circuit, a current sensor, a current averaging circuit and a controller. The switching circuit selectively applies an input voltage to the inductive device to develop an output voltage. The current sensor senses current through the switching circuit and provides a current sense signal as a ramp-on-a-step waveform. The current averaging circuit receives the current sense signal and provides a current average signal. The current averaging circuit includes first, second and third sample and hold circuits and a sample averaging circuit. The first sample and hold circuit samples the beginning of each pulse of the current sense signal and provides corresponding short samples. The second sample and hold circuit samples the duration of each the pulse and provides corresponding long samples. The sample averaging circuit averages corresponding ones of the short and long samples and provides corresponding average values. The third sample and hold circuit samples each average value and provides the current average signal. The controller controls the switching circuit based on the current average signal.

In various embodiments, the power converter may be an isolated or a non-isolated converter. In the non-isolated case, the current averaging circuit may be used to measure current during off-times of the switching circuit in which the pulses have negative slopes. Operation is substantially identical regardless of whether the ramps have positive or negative slopes.

A method of averaging a piecewise linear switching current waveform of a PWM power converter includes sampling a short duration of the current waveform at a start of each PWM cycle and providing corresponding short samples, sampling a long duration of each PWM cycle and providing corresponding long samples, averaging respective ones of the short and long samples and providing corresponding average values, and sampling each average value and providing a current average signal.

Each sampling may include coupling and charging a capacitor. In this case, the method may include closing a first switch for a short duration and charging a first capacitor at the start of each PWM cycle, closing a second switch and charging a second capacitor for the duration of each PWM cycle, and closing a third switch after each long duration and charging a third capacitor. The piecewise linear switching current waveform may include ramp-on-a-step pulses. In this case, the method may include closing a first switch to charge a first capacitor at the beginning of each pulse, closing a second switch to charge a second capacitor for the duration of each pulse, and closing a third switch and charging a third capacitor at the end of each pulse. The method may include applying the short and long samples across a resistive voltage differencing junction. The method may include sensing current through switching devices of the PWM power converter and rectifying sensed current.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The invention described herein provides a method of accurately capturing the average value of a piecewise linear switching current waveform of various types of pulse width modulation (PWM) power converters. The current waveform is typically a ramp-on-a-step waveform, where the average value is provided on a pulse-by-pulse basis, where the average value is captured (sampled and held) and presented at the end of each current pulse. The captured value remains valid until the end of the next current pulse, at which time it is updated with the new value. This average current output information can then be used to implement average current mode operation or average current limiting on a pulse-by-pulse basis. Alternatively this output is filtered to provide a time averaged current indication.

Figure 1:
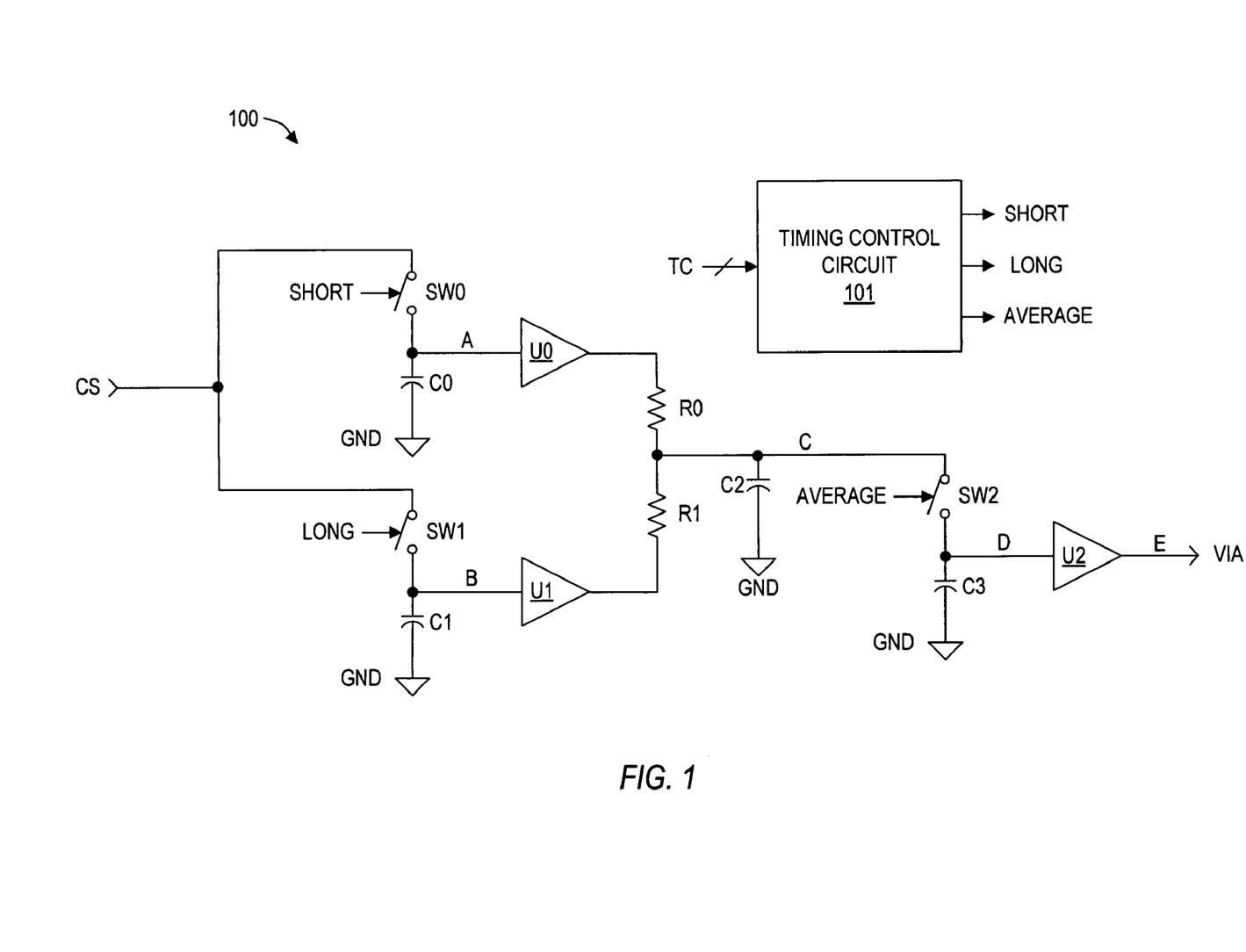
FIG. 1 is a schematic diagram of an exemplary current averaging circuit implemented according to an embodiment of the present invention.

FIG. 1 is a schematic diagram of an exemplary current averaging circuit 100 implemented according to an embodiment of the present invention. In one embodiment, the current averaging circuit 100 is implemented onto a power management chip which controls one or more electronic switches according to PWM operation to convert an input voltage VIN to a regulated output voltage VOUT. Alternatively, discrete embodiments are contemplated in which the current averaging method is implemented off-chip. For the on-chip embodiments, a current sense (CS) input pin is provided for sensing the current in the PWM electronic switches as known to those skilled in the art. Other current sensing techniques are known, where the CS pin or other techniques provide a current sense (CS) signal on a CS node that generates a voltage indicative of current.

As shown in FIG. 1, a CS node developing a CS signal is coupled to one terminal of a first single-pole, single-throw (SPST) switch SW0. As used herein, a node and the signal it carries assume the same name unless otherwise indicated. The other terminal of SW0 is coupled to a node A, which is coupled to one end of a first capacitor C0 and to the input of a first buffer U0. The other end of the capacitor C0 is coupled to a common node, such as ground (GND). The output of the buffer U0 is coupled to one end of a resistor R0, having its other end coupled to a node C. The CS node is also coupled to one terminal of another SPST switch SW1, having its other terminal coupled to a node B. Node B is coupled to one end of a second capacitor C1 and to the input of a second buffer U1. The other end of the capacitor C1 is coupled to GND. The output of the buffer U1 is coupled to one end of a resistor R1, having its other end coupled to node C.

Node C is coupled to one terminal of another SPST switch SW2 and to one end of a capacitor C2, having its other end coupled to GND. The other terminal of SW2 is coupled to a node D, which is coupled to the input of another buffer U2 and to one end of a capacitor C3. The other end of the capacitor C3 is coupled to GND. The output of the buffer U2 is a node E providing an output voltage signal VIA that represents the average value of the ramp-on-a-step current on a pulse-by-pulse basis. Switch SW0 has a control input receiving a control signal SHORT provided by a timing control circuit 101. The control circuit 101 also generates a control signal LONG provided to a control input of the switch SW1, and a control signal AVERAGE provided to the control input of the switch SW2. In each case, when the control signal (SHORT, LONG, AVERAGE) is de-asserted low, the switch (SW0, SW1, SW2) is open and when the control signal is asserted high, the switch is closed. The SPST switches SW0–SW2 may each be implemented in any suitable manner as known to those skilled in the art, such as transistor devices or the like including field-effect transistors (FETs), metal-oxide-semiconductor FETs (MOSFETs), bipolar-junction transistors (BJTs), complementary MOS (CMOS) devices (e.g., N-channel devices or P-channel devices or a CMOS combination), etc. As shown, the timing control circuit 101 receives one or more timing control (TC) signals for purposes of timing the SHORT, LONG and AVERAGE signals.

In the embodiment illustrated, the buffers U0 and U1 have substantially the same gain relative to each other, such as unity gain buffers or the like. The buffer U2 is also a unity gain buffer so that node E is a buffered version of node D. The resistors R0 and R1 have substantially the same resistance, so that node C develops a voltage that is the average value of the voltages of the nodes A and B reflected at the outputs of the buffers U0 and U1, respectively. For example, if the voltages of the nodes A and B are the same, such as 1 Volt (V), then the node C is the same (e.g., 1V); and if the voltages of the nodes A and B are different, such as 1V and 5V, respectively, then the node C is between the A and B voltages (e.g., 3V), and so on. The resistors R0 and R1 can be thought of as a resistive differencing junction coupled to the capacitor C2. The average voltage on node C is transferred to node D by pulsing switch SW2, so that node E represents an average value on a pulse-by-pulse basis. In an alternative embodiment, another unity gain buffer may be inserted between capacitor C2 and switch SW2 to buffer the average value developed on the capacitor C2 provided to charge the capacitor C3 during each cycle.

Figure 2:
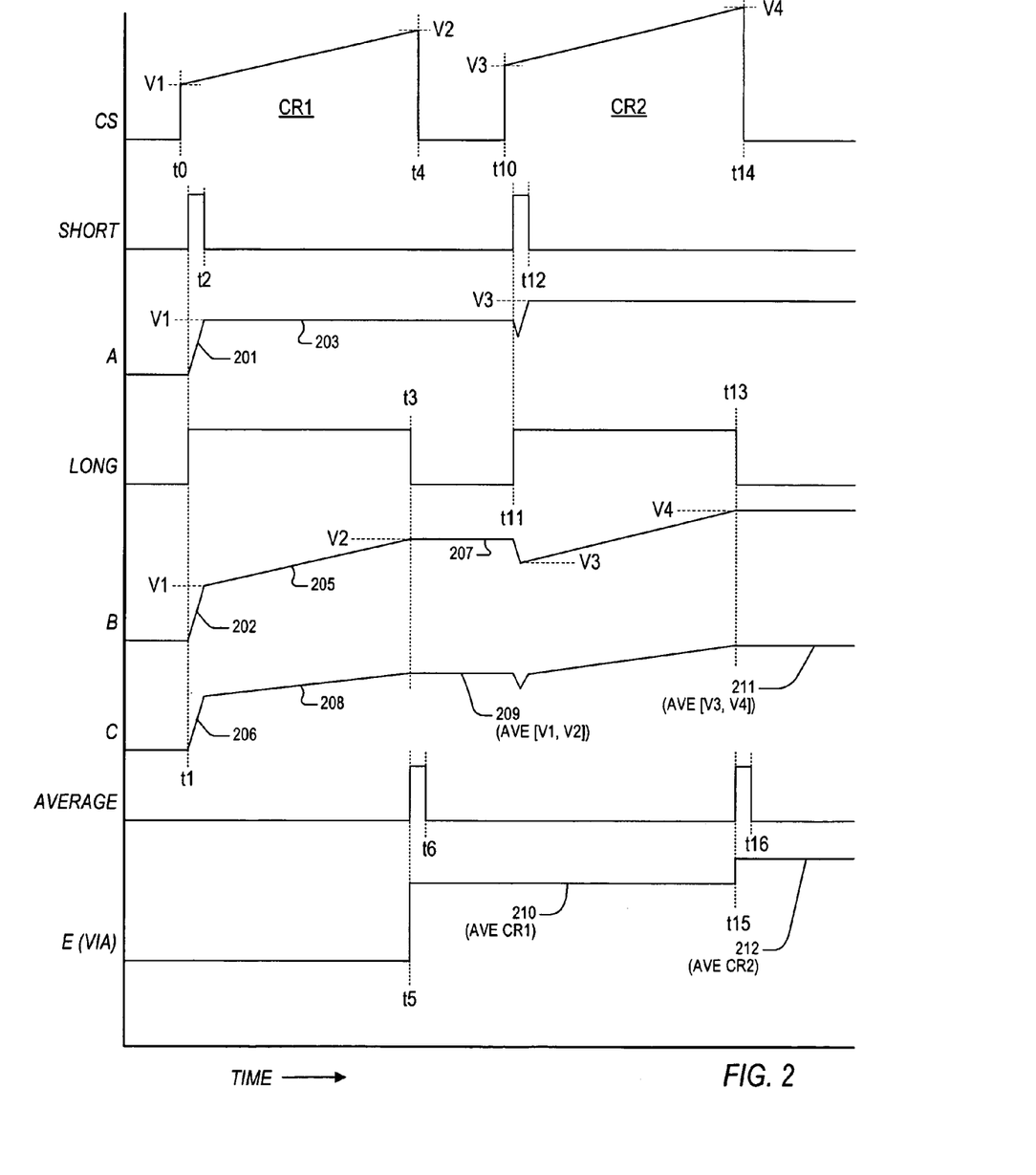
FIG. 2 is a timing diagram illustrating operation of the current averaging circuit of FIG. 1.

FIG. 2 is a timing diagram illustrating operation of the current averaging circuit 100. The CS, SHORT, A, LONG, B, C, AVERAGE and E (or VIA) signals (or nodes) are plotted verses TIME. Two ramp-on-a-step current pulses CR1 and CR2 are shown asserted on the CS node. The first current pulse CR1 starts at a time t0 at a voltage V1 and ramps up to a maximum value V2 at a time t4. At a time t1 after a short delay from time t0 to allow for switching transients (e.g., 50 nanoseconds (ns)), the SHORT signal is asserted to initiate a "short" sample near the beginning of the CR1 current pulse. Switch SW0 is closed and the voltage of the CS node charges capacitor C0 to approximately the same value (e.g., V1), which voltage appears on node A. The SHORT signal is asserted for a short period (e.g., approximately 50 ns) and is then de-asserted at a time t2 to re-open switch SW0. Ideally, the capacitor C0 charges very quickly, shown as a ramp 201, and the SHORT pulses are as narrow as possible and positioned in time as close to the initial rising edge of the CR1 current pulse to sample the voltage V1 as accurately as possible. The SHORT pulses are slightly delayed and have sufficient duration to avoid transients of the CR1 pulse and to allow the capacitor C0 to fully charge to the initial voltage level of CR1. Thus, the switch SW0 is held closed for a sufficient amount of time for the capacitor C0 to charge to the initial voltage of CR1 to be as close as practically possible to the V1 voltage. The short sample is thus stored on the capacitor C0 as a steady-state value beginning at time t2 on node A as shown at 203. The short sample is buffered by U0 and the short sample or voltage value V1 is asserted at its output. This short value represents the current amplitude near the start of the first current pulse CR1.

At the same time the short sample is turned on, a "long" sample is also turned on as shown by the LONG signal being asserted high at time t1, which closes the switch SW1. When the switch SW1 is closed, the voltage of the CS node charges the capacitor C1 on node B, so that the B node also quickly ramps to the voltage V1 as shown by ramp 202 in a similar manner as the A node. The LONG signal, however, is left asserted high keeping the switch SW1 closed until a time t3, which is shortly before (e.g., approximately 10 ns before) the end of the current pulse CR1. While SW1 is closed, the capacitor C1 charges to sample CR1 at node B shown as a ramp at 205. The LONG signal is de-asserted at time t3 to re-open switch SW1, so that the long sample is stored on the capacitor C1, shown at 207 as a steady-state value beginning at time t3. The capacitor C1 effectively charges approximately to the voltage V2 being the voltage of the pulse CR1 just prior to termination. The long sample is the current amplitude information for the end of the ramp of the current pulse CR1 stored on the capacitor C1, which is buffered and asserted as a long value V2 at the output of the buffer U1. The switch SW1 is held closed by the LONG signal as long as possible to capture the voltage V2 without extending past termination of the current pulse CR1.

The short and long sample information stored on the capacitors C0 and C1 and buffered through buffers U0 and U1, respectively, are averaged by the two equal-valued resistors R0 and R1 tied between the outputs of the short and long sample and hold circuits and tied together at node C. In the particular embodiment shown, the voltage of the C node, asserted across the capacitor C2, ramps up as shown at 206 to the voltage V1 in a similar manner as the nodes A and B. Then the voltage of the C node ramps up as shown at 208 following the ramping voltage of node B, except at approximately half the slope of the B node since averaging both nodes A and B. At time t3 when the switch C1 is opened, the node C holds a steady state average voltage value of the A and B nodes as shown at 209. Since the A node charged to about V1 and the B node charged to about V2, the steady state voltage on node C shown at 209 is the average of the V1 and V2 voltages, or (V1+V2)/2.

About when the ramp of the current pulse CR1 terminates at time t4, the AVERAGE signal is asserted high at time t5 and then asserted low again at time t6 a short time later (e.g., about 50 ns). The AVERAGE signal closes the switch SW2 so that the voltage on node C is sampled onto the capacitor C3 represented as node D. The average value sampled on the capacitor C3 is buffered by buffer U2 and presented to the output node E as shown at 210, which is the average sample value of the first current pulse CR1. Assuming that the buffer U2 is a unity gain buffer, the steady state voltage on node E as shown at 210 is the average of the voltages V1 and V2.

The process is repeated for the second ramp-on-a-step current pulse CR2, which begins at time t10 and ends at subsequent time t14. In this case, the pulse CR2 starts at a voltage V3 and ramps to a voltage V4. The SHORT and LONG signals are both asserted at time t11. The SHORT signal is de-asserted a short time later at time t12 and the LONG signal is de-asserted near the end of the ramp of the current pulse CR2 at time t13 just before time t4. An average sample voltage develops on node C as shown at 211, which is the average of the voltages V3 and V4. The AVERAGE signal is then pulsed between times t15 and t16 at the end of the current pulse CR2 to sample its average value onto the capacitor C3 and node D, which is buffered by the buffer U2 to the output node E as shown at 212. In this manner, the average value for the first current pulse CR1 is held on node E and remains unchanged until the end of the next current pulse CR2, at which time node E is updated with the next average value at about time t15. Operation repeats on this manner on a pulse-by-pulse basis.

In summary, the switches SW0 and SW1 are turned on at approximately the same time at the beginning of each PWM pulse so that nodes A and B initially charge to the same voltage. Node C also initially charges to the same voltage as nodes A and B. The switch SW0 is pulsed on and off to effectively sample the CS node voltage at the beginning of the PWM pulse, where the sampled voltage on node A is held at the output of the buffer U0. The switch SW1 remains on to the end of the same pulse so that node B follows the voltage of the CS node and ramps to a different voltage level, which voltage is provided at the output of the buffer U1. Thus, node C starts with the same voltage as nodes A and B and then ramps at a voltage in the middle of the voltages of the nodes A and B, representing the average voltage value of the pulse on node CS. Switch SW2 is then pulsed at the end of each current pulse to sample the average value on node D, which value is buffered and asserted onto node E as the signal VIA. Thus, the average value for each current pulse is provided on node E just after the pulse is completed and held on node E until the end of the next current pulse.

Figure 3:
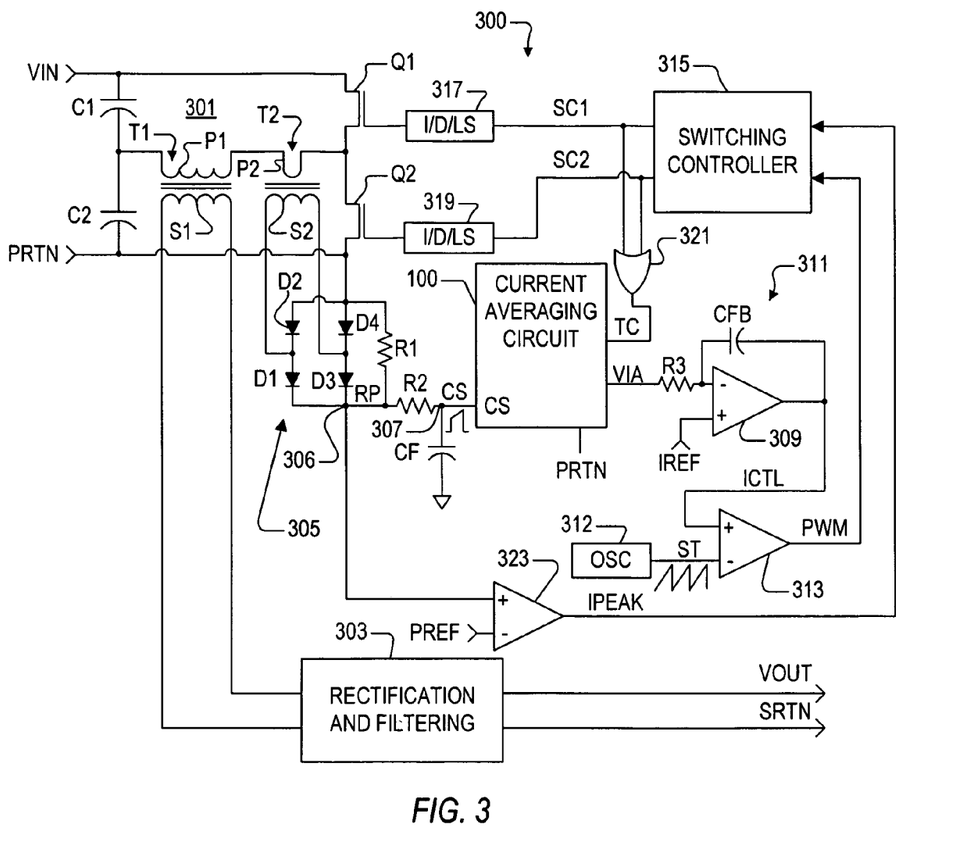
FIG. 3 is a schematic and block diagram of an exemplary unregulated power converter implemented according to an embodiment of the present invention employing the current averaging circuit of FIG. 1.

FIG. 3 is a schematic and block diagram of an exemplary unregulated power converter 300 implemented according to an embodiment of the present invention employing the current averaging circuit 100. Although an unregulated power converter is illustrated, the present invention applies equally to regulated power converters. The power converter 300 includes an exemplary half-bridge converter 301 including DC capacitors C1 and C2, a power transformer T1, a current sense transformer T2, and switches Q1 and Q2. The present invention applies equally to regulators employing full-bridge converters and the like, including single-ended and double-ended topologies. The switches Q1, Q2 are designated with Q reference numbers and schematically shown as simplified representations of field-effect transistors (FETs), where it is understood that the switches Q1, Q2 may be implemented as suitable alternative electronic switching devices, such as N-channel devices, P-channel devices, metal-oxide semiconductor FETs (MOSFETs), bipolar-junction transistors (BJTs), insulated gate bipolar transistors (IGBTs), or any other electronic switch configuration as known to those skilled in the art. An input voltage (VIN)

signal is provided to one end of the capacitor C1 and to a first current terminal (e.g., drain or source) of the switch Q1. The second current terminal of switch Q1 is coupled to a first current terminal of Q2 and to one end of a primary winding P2 of the current sense transformer T2. The other end of the primary winding P2 is coupled to one end of a primary winding P1 of the transformer T1. The other end of the capacitor C1 is coupled to the other end of the primary winding P1 and to one end of the capacitor C2. The other end of the capacitor C2 and the second current terminal of Q2 are coupled together to develop a primary return (PRTN) signal. The terminals of a secondary winding S1 of the transformer P1 are provided to a rectification and filtering circuit 303, which develops an output voltage (VOUT) signal relative to a secondary return (SRTN) signal.

The current sense transformer T2 includes a secondary winding S2, which is coupled to a full-wave rectifier circuit 305 including diodes D1–D4. In particular, one end of the secondary winding S2 is coupled to the anode of diode D1 and to the cathode of diode D2. The other end of the secondary winding S2 is coupled to the anode of diode D3 and to the cathode of diode D4. The anodes of diodes D2 and D4 are coupled together and to the PRTN node, which is further coupled to one end of a burden resistor R1. The cathodes of diodes D1 and D3 are coupled together at a node 306, which is coupled to the other end of the resistor R1 and which develops a rectified primary (RP) signal. The node 306 is coupled to one end of a filter resistor R2, having its other end coupled to a current sense (CS) node 307 having the characteristic ramp-on-a-step waveform. The CS node is filtered by a capacitor CF (referenced to GND or to PRTN) and provided to the CS input of the current averaging circuit 100, which is referenced to PRTN as the relative GND signal. The current averaging circuit 100 samples the CS node 307 as previously described and generates the VIA signal, which is a voltage proportional to average output current of the power converter 300. The VIA signal is provided to one end of a resistor R3, having its other end coupled to the inverting or negative (−) input of an amplifier (e.g., an operational amplifier or op amp, comparator, etc.) 309 and to one end of a feedback capacitor CFB. The other end of the capacitor CFB is coupled to the output of the amplifier 309, which develops a current control (ICTL) signal. A current reference (IREF) signal is provided to the non-inverting or positive (+) input of the amplifier 309. The resistor R3, the capacitor CFB and the amplifier 309 form a current amplifier 311, which compares the VIA and IREF signals for developing the ICTL signal.

The ICTL signal is provided to the non-inverting input of another amplifier 313, which receives a sawtooth (ST) signal at its inverting input. An oscillator (OSC) 312 is typically used to generate the ST signal as shown. The amplifier 313 serves as a pulse-width modulation (PWM) generator for developing a PWM signal, which is provided to an input of a switching controller 315. The RP signal is also provided to the non-inverting input of another amplifier 323, which receives a peak reference (PREF) voltage signal at its inverting input. The output of the amplifier 323 asserts a peak current limit signal IPEAK, which is provided to another input of the switching controller 315. The peak current limit detector amplifier 323 operates similar to peak limit control circuits known to those skilled in the art and is not further described. The switching controller 315 receives the PWM and IPEAK signals and develops multiple switching control (SC) signals, including first and second switching control signals SC1 and SC2 signals. The SC1 and SC2 signals are each provided to respective isolation/driver/level shifter (I/D/LS) circuits 317 and 319, which drive the gates of switches Q1 and Q2, respectively, of the half-bridge converter 301. The SC1 and SC2 signals are also provided to respective inputs of a 2-input OR gate 321, which generates at least one TC (timing control) signal provided to the current averaging circuit 100. The TC signal(s) is (are) provided to or otherwise used by the timing control circuit 101 for timing the SHORT, LONG and AVERAGE signals used for current sampling.

The switching controller 315 activates the switch Q1 during a first half of each PWM cycle and activates the switch Q2 during the second half cycle of the PWM cycle and operation continuously alternates in this manner as known to those skilled in the art. The current amplifier 311 amplifies the difference between the output average current signal VIA and the IREF signal, which corresponds to the desired average current limit, and generates the ICTL signal used to control the duty cycle of the PWM signal during an overload condition. During normal operation when the average current signal VIA is less than IREF, the ICTL signal asserted by the current amplifier 311 is at a maximum and the PWM signal is generated with maximum duty cycle. If the output current increases and causes an overload condition, the VIA signal is increased above the IREF signal and the ICTL signal is correspondingly reduced by the current amplifier 311. The reduction of the ICTL signal reduces the duty cycle of the PWM signal so that the output current does not exceed the target current level determined by the IREF signal. In this manner, the average current method produces a constant or "brick-wall" current limit behavior.

Figure 4:
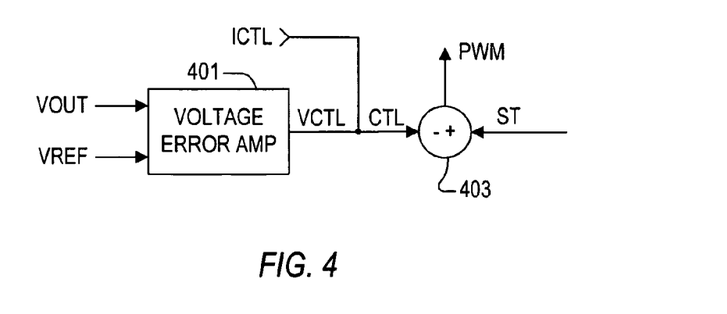
FIG. 4 is a block diagram of exemplary circuitry used to convert the unregulated power converter of FIG. 3 to a voltage mode controlled power converter.

FIG. 4 is a block diagram of exemplary circuitry used to convert the unregulated power converter 300 to a voltage mode controlled power converter. A voltage error amplifier 401 is added to measure the voltage level of the VOUT signal, and which outputs a corresponding voltage control (VCTL) signal. The VCTL signal is proportional to the difference between the VOUT signal and an output voltage reference (VREF) signal also provided to an input of the amplifier 401. The output of the voltage error amplifier 401 is summed or otherwise connected to the ICTL output of a current error amplifier 311 in such a manner so as to allow the amplifier having the lowest output signal to dominate. Thus the current error amplifier 311 asserts the current control signal ICTL summed together or otherwise connected with the VCTL signal to collectively provide a control signal CTL, representing whichever of the ICTL or VCTL signals is lower. The CTL signal is provided to a negative or inverting input (−) of a PWM comparator 403, which receives a sawtooth signal ST at its positive or non-inverting input (+). The comparator 403, which replaces the comparator 313 of the unregulated power converter 300 for conversion to a regulated converter, compares the CTL signal with the ST signal and generates at its output the PWM signal provided to the switching controller 315. When voltage-mode control is used, the average over-current protection method using the current averaging circuit 100 maintains flux balance in the transformer T1 by maintaining duty cycle symmetry between half-cycles.

Figure 5:
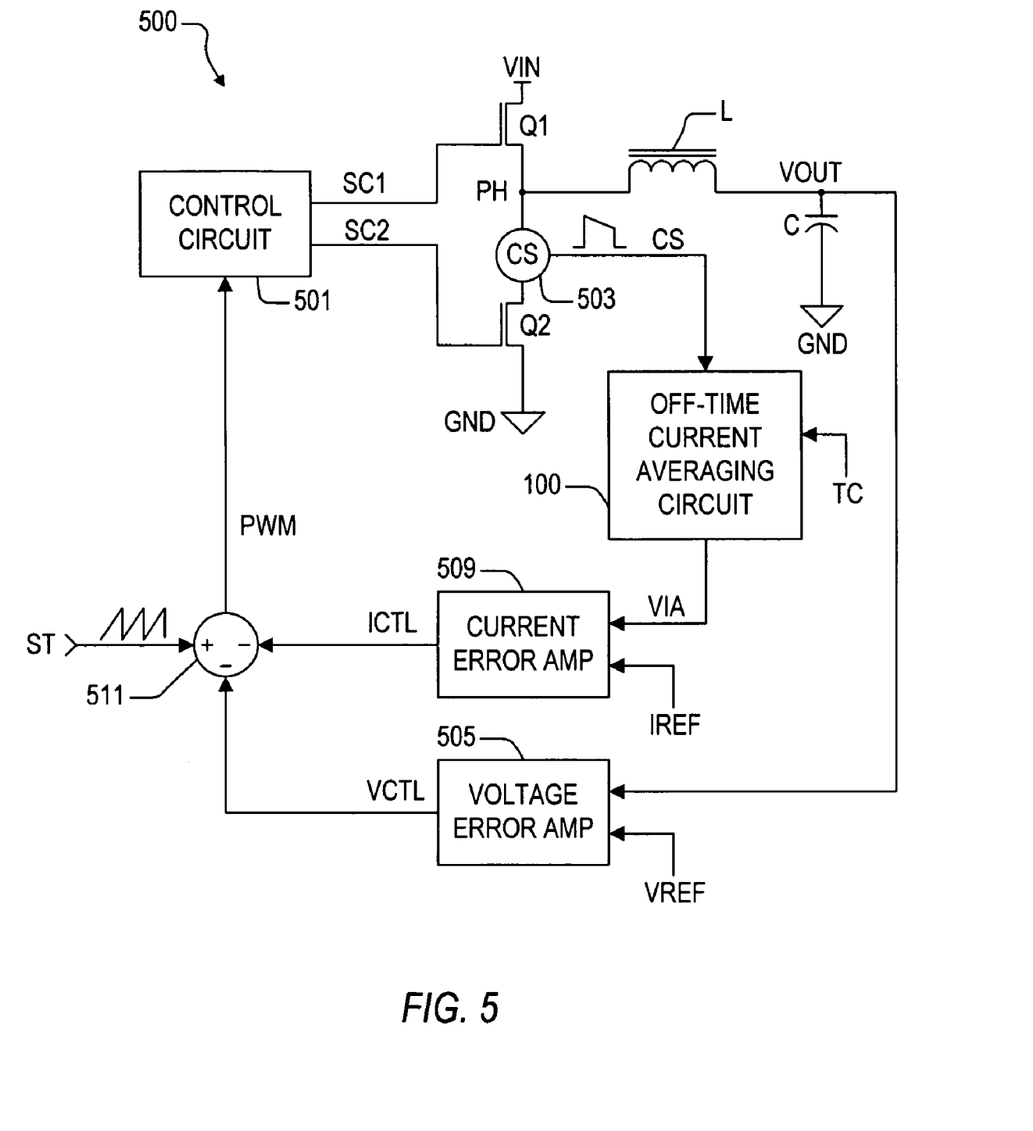
FIG. 5 is a schematic and block diagram of a non-isolated DC-DC buck converter employing the current averaging circuit of FIG. 1 for averaging "off-time" current.

FIG. 5 is a schematic and block diagram of an exemplary non-isolated DC—DC buck converter 500 employing the current averaging circuit 100 for averaging "off-time" current. In general, a buck converter converts an unregulated input voltage VIN to a regulated output voltage VOUT, where VOUT is less than VIN. The present invention equally applies to boost, buck-boost, and other non-isolated converters in which the output voltage is greater than, equal to or less than the input voltage. A PWM control circuit 501 generates switch control signal SC1 and SC2 based on a PWM signal in a similar manner as previously described. The SC1 signal is provided to the gate of Q1 and the SC2 signal is provided to the gate of Q2, where Q1 and Q2 are again shown as FETs but may be implemented according to any suitable electronic switch configuration. The current path (e.g., drain-source or source-drain) of Q1 is coupled between VIN and a phase (PH) node and the current path of Q2 is coupled between the PH node and ground. The PH node is coupled to one end of an output inductor L, having its other end developing the output voltage signal VOUT filtered by capacitor C referenced to GND. The VOUT signal is fed back to a voltage error amplifier 505, which receives and compares the VREF signal with the VOUT signal to develop the voltage control signal VCTL in a similar manner as previously described.

A current sensor 503 is inserted between the PH node and Q2. The current sensor 503 may be implemented according to any one of several techniques, such as MOSFET RDSON, discrete sense resistor, current transformer, hall effect device, etc. The current sensor 503 generates the CS signal provided to the CS input of the current averaging circuit 100. The current averaging circuit 100 receives the TC signal(s) and generates the VIA signal in a similar manner as previously described. Operation is substantially identical, except that the ramp portion of the ramp-on-a-step waveform has a negative slope and thus operates as an off-time current sensing circuit while Q2 is on. As understood by those skilled in the art, Q1 is turned on or activated during the "on-time" to couple VIN to the inductor L to drive the voltage of VOUT during the first half of each PWM cycle. Then Q1 is turned off and Q2 is turned on during the "off time" to couple the inductor L to GND during a second half of each PWM cycle. The current averaging circuit 100 generates the current averaging signal VIA, which is provided to an input of a current error amplifier 509. The current error amplifier 509 receives and compares the IREF signal with the VIA signal to develop the ICTL signal in a similar manner as previously described. The ICTL and VCTL signals are provided to respective negative inputs of a PWM comparator 511, which receives the sawtooth (ST) signal at another, positive input. The PWM comparator 511 operates in a similar manner as the PWM comparator 403 in which the lower voltage one of the ICTL and VCTL dominates for purposes of control. The PWM comparator 511 generates the PWM signal provided to the control circuit 501 to complete the control loop.

Figure 6:
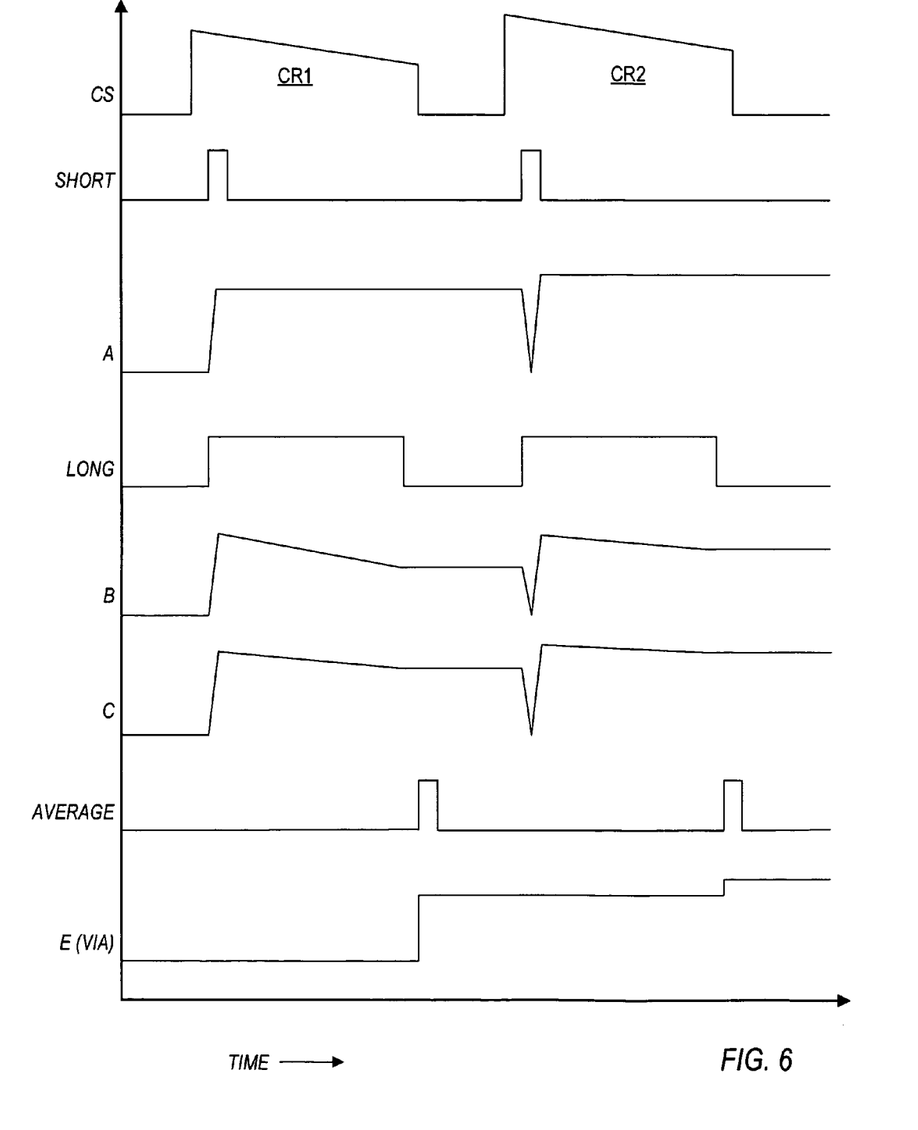
FIG. 6 is a timing diagram illustrating operation of the current averaging circuit of FIG. 1 as employed as an off-time current averaging circuit in the buck converter of FIG. 5.

FIG. 6 is a timing diagram illustrating operation of the current averaging circuit 100 being employed as an off-time current averaging circuit in the buck converter 500. Again, the CS, SHORT, A, LONG, B, C, AVERAGE and E (or VIA) signals (or nodes) are plotted verses TIME. The signal waveforms shown in FIG. 6 are very similar to those shown in FIG. 2, except that the current pulses CR1 and CR2 exhibit negative-sloping ramps rather than positive-sloping ramps. The waveform on the A node is similar except representing the higher-voltage initial values of the negative-sloped current pulses CR1 and CR2. The B waveform and the average waveform on the C node are both similar to those of FIG. 2 except having negative-sloping ramps. The E node providing the VIA signal is very similar since the average of the negative-sloping current pulses for the off-time is similar to the average of the positive-sloping ramps for the on-time.

Figure 7:
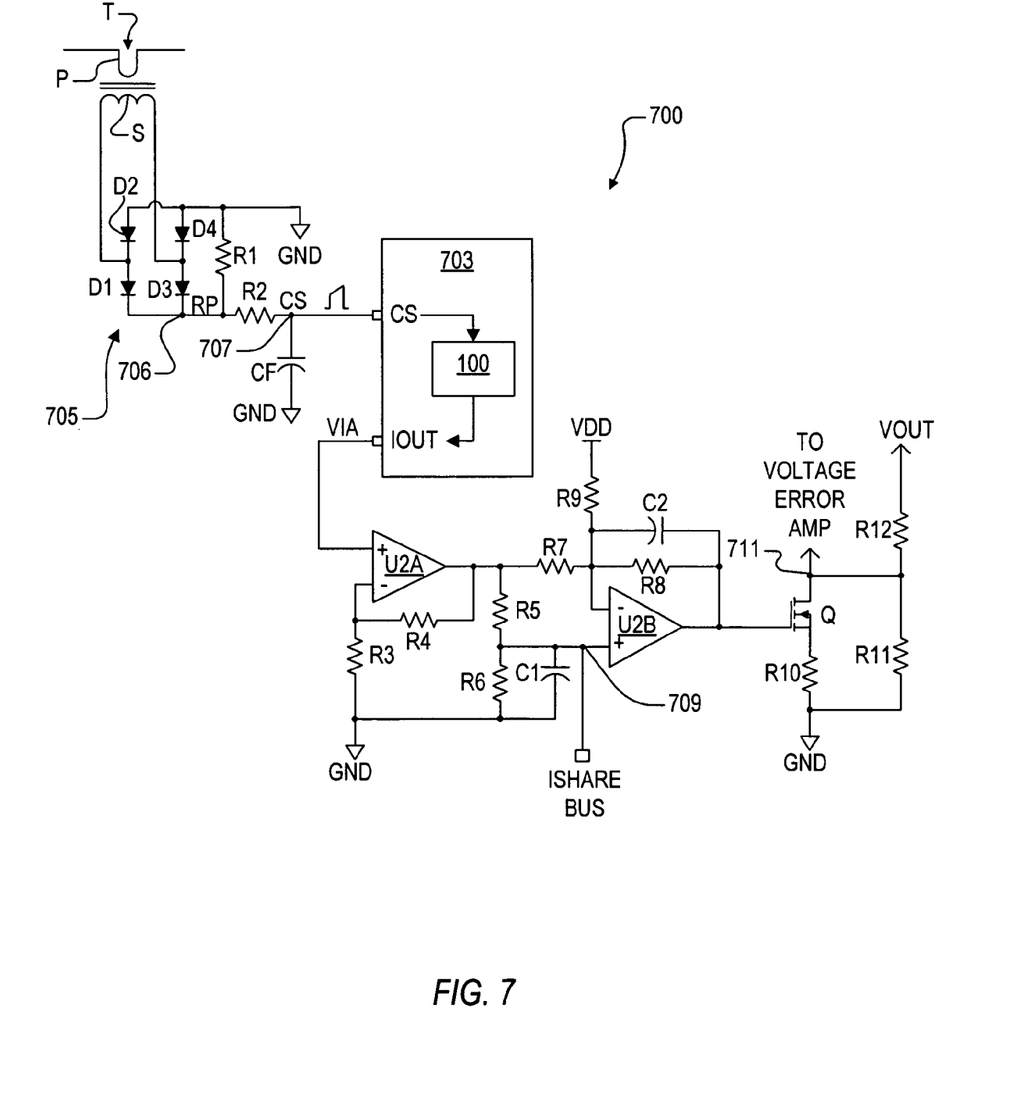
FIG. 7 is a schematic and block diagram of a current share system including the current averaging circuit of FIG. 1.

FIG. 7 is a schematic and block diagram of a current share system 700 including the current averaging circuit 100. In this case, the current averaging circuit 100 is integrated onto a PWM controller integrated circuit (IC) or chip 703 having a CS pin for receiving the sensed current provided the input of the current averaging circuit 100 and an IOUT pin of the chip 703 providing the average current signal VIA. In one embodiment, the VIA signal may be further amplified by an internal buffer (e.g., 4×, not shown) for providing the VIA signal. A current sense transformer T includes a primary winding P sensing current and a secondary winding S. The secondary winding S is coupled to a full-wave rectifier circuit 705 including diodes D1–D4 in the same manner as shown in FIG. 3. In particular, one end of the secondary winding S is coupled to the anode of diode D1 and to the cathode of diode D2. The other end of the secondary winding S is coupled to the anode of diode D3 and to the cathode of diode D4. The anodes of diodes D2 and D4 are coupled together at ground (GND) and to one end of a burden resistor R1. The cathodes of diodes D1 and D3 are coupled together at a node 706, which is coupled to the other end of the resistor R1 and which develops the rectified primary RP signal RP. The node 706 is coupled to one end of a filter resistor R2, having its other end coupled to a current sense (CS) node 707 having the characteristic ramp-on-a-step waveform. The CS node 707 is filtered by capacitor CF (referenced to GND) and is provided to the CS pin of the PWM controller chip 703.

The VIA signal on the IOUT pin of the PWM controller chip 703 is provided to the non-inverting input of an amplifier U2A, which has an inverting input coupled to one end of each of resistors R3 and R4. The other end of resistor R3 is coupled to GND and the other end of R4 is coupled to the output of amplifier U2A and to one of each of resistors R5 and R7. The other end of resistor R5 is coupled to a node 709 forming an ISHARE BUS. A resistor R6 and a capacitor C1 are coupled in parallel between GND and node 709, and node 709 is further coupled to the non-inverting input of another amplifier U2B. The other end of resistor R7 is coupled to the inverting input of amplifier U2B, to one end of a feedback resistor R8, to one end of a resistor R9 and to one end of another capacitor C2. The other end of resistor R9 is coupled to a source voltage VDD, and the other ends of the resistor R8 and the capacitor C2 are coupled together and to the output of the amplifier U2B. The output of the amplifier U2B is coupled to the gate of a MOSFET Q, having its source coupled to one end of a resistor R10 and its drain coupled to a node 711 forming a junction between voltage divider resistors R11 and R12. The other ends of resistors R10 and R11 are coupled to ground and the other end of the resistor R12 is coupled to VOUT.

The current share system 700 is repeated for each phase of multiple power systems sharing current to drive a common output node developing the VOUT signal. The ISHARE BUS nodes 709 of each current share system 700 are coupled together. In this manner, all of the ISHARE systems are coupled in parallel such that any one system becomes master at any give time while the rest are slaves. VOUT is divided by R11 and R12 at node 711, which is coupled to a voltage error amplifier (e.g., within the PWM controller chip 703). U2A sets the signal amplitude of the ISHARE BUS node 709, and U2B is the ISHARE BUS amplifier. R7 and C2 set the current share bandwidth, and R8 limits the gain of the current share amplifier U2B. R7 and R9 set the maximum load difference between the master system and the slave systems. R10 sets the maximum amount of change of VOUT that the current share system 700 can induce to force current sharing.

In operation, multiple current share systems 700 perform a current share method which monitors the power supply supplying the highest current. The power supply providing the highest current output is defined as the master, whereas the remaining power supplies are slaves. The master controls the ISHARE BUS, where the master may change dynamically depending on loading conditions. The amplitude of the ISHARE BUS indicates the current load of the master. The current share system 700 of each slave power supply compares its internal average current level to that of the ISHARE BUS, and if too low (i.e., lower than the ISHARE BUS), pulls current from the output voltage feedback divider network. In particular, when the inverting input of the amplifier U2B drops below the ISHARE BUS node 709, the amplifier U2B drives Q to draw current from node 711 thereby reducing its voltage. This causes the output voltage VOUT to appear too low to the local power supply, so that it attempts to increase VOUT thereby increasing its output current. Eventually, one of the slaves begins to source more current than the master and becomes master. The current share systems 700 incorporates hysteresis so that any given master stays master for at least a minimum amount of time to prevent undesired oscillations and to prevent thrashing among the multiple current share systems 700.

An average current limit and control circuit according to an embodiment of the present invention may be used by any PWM power converter requiring a well-behaved current control limit characteristic. The control circuit produces a constant or "brick-wall" current limit behavior so that a maximum current level is not exceeded but instead stays constant under excess load conditions. The output power level remains constant so that the maximum current level is not exceeded but instead the output voltage is allowed to collapse. The control circuit is particularly useful for battery-powered electronic devices including portable or mobile devices and the like in which it is desired to limit the current to a predetermined maximum level. Such configurations may include non-isolated power topologies. Yet the control circuit is also useful for high-powered devices and AC-powered devices such as computer server systems and the like employing isolated power topologies.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A current averaging circuit for averaging a piecewise linear switching current waveform of a pulse width modulation (PWM) power converter, comprising:
   a first sample and hold circuit that samples a short duration of the current waveform at a start of each PWM cycle and that provides corresponding short samples;
   a second sample and hold circuit that samples a long duration of each each PWM cycle and that provides corresponding long samples;
   a sample averaging circuit, coupled to said first and second sample and hold circuits, that averages corresponding short and long samples and that provides corresponding average values; and
   a third sample and hold circuit that samples each said average value and that provides a current average signal.

2. The current averaging circuit of claim 1, wherein said first, second and third sample and hold circuits each comprise a switch coupled to a capacitor.

3. The current averaging circuit of claim 2, wherein said first, second and third sample and hold circuits each further comprise a buffer having an input coupled to a corresponding capacitor and an output providing sampled values.

4. The current averaging circuit of claim 2, further comprising a timing control circuit that controls said switch of each of said first, second and third sample and hold circuits.

5. The current averaging circuit of claim 4, wherein said timing control circuit provides a short control signal to a first switch of said first sample and hold circuit, a long control signal to a second switch of said second sample and hold circuit, and an average control signal to a third switch of said third sample and hold circuit.

6. The current averaging circuit of claim 5, wherein the piecewise linear switching current waveform comprises ramp-on-a-step pulses, and wherein said timing control circuit provides said short control signal as a short pulse at a start of each current waveform pulse, said long control signal as a long pulse for a duration of each current waveform pulse, and said average control signal as a short pulse at an end of each current waveform pulse.

7. The current averaging circuit of claim 1, wherein said sample averaging circuit comprises a resistive differencing junction coupled to a capacitor.

8. A power converter, comprising:
   an inductive device;
   a switching circuit which selectively applies an input voltage to said inductive device to develop an output voltage;
   a current sensor that senses current through said switching circuit and that provides a current sense signal as a ramp-on-a-step waveform;
   a current averaging circuit that receives said current sense signal and that provides a current average signal, said current averaging circuit comprising:
      a first sample and hold circuit that samples the beginning of each pulse of said current sense signal and that provides corresponding short samples;
      a second sample and hold circuit that samples the duration of each said pulse and that provides corresponding long samples;
      a sample averaging circuit, coupled to said first and second sample and hold circuits, that averages corresponding ones of said short and long samples and that provides corresponding average values; and
      a third sample and hold circuit that samples each said average value and that provides said current average signal; and
   a controller that controls said switching circuit based on said current average signal.

9. The power converter of claim 8, wherein:
   said inductive device comprises a first transformer having a primary and a secondary;
   wherein said switching circuit comprises first and second switches coupled to said primary of said first transformer and wherein said secondary develops said output voltage; and
   wherein said controller comprises:
      a first amplifier having inputs receiving said current average signal and a current reference signal and an output providing a current control signal;

a second amplifier having inputs receiving said current control signal and an oscillation signal and an output providing a pulse width modulation (PWM) signal; and a switching controller having an input receiving said PWM signal and first and second outputs providing first and second switching control signals to said first and second switches, respectively.

10. The power converter of claim 9, wherein said current sensor comprises:

a sense transformer having a primary coupled in series with said primary of said first transformer and a secondary; and a rectification circuit which provides said current sense signal.

11. The power converter of claim 10, further comprising:

control logic having inputs receiving said first and second switching control signals and an output providing a timing control signal; and wherein said current averaging circuit further comprises a timing control circuit having an input receiving said timing control signal and a plurality of outputs for controlling said first, second and third sample and hold circuits.

12. The power converter of claim 9, further comprising a third amplifier having inputs receiving said output voltage and an output reference voltage and an output providing a voltage control signal, and wherein said second amplifier comprises a comparator having inputs receiving said current control signal, said voltage control signal, and said oscillation signal and an output providing said PWM signal.

13. The power converter of claim 8, wherein:

said switching circuit comprises a first switch having a control terminal and a pair of current terminals coupled between said input voltage and a phase node and a second switch having a control terminal and a pair of current terminals coupled between said current sensor and ground;

wherein said current sensor has input terminals coupled between said phase node and said second switch and an output providing said current sense signal; and wherein said controller comprises:

a first amplifier having inputs receiving said current average signal and a current reference signal and an output providing a current control signal;

a comparator having first and second inputs receiving said current control signal and an oscillation signal, respectively, and an output providing a pulse width modulation (PWM) signal; and a control circuit having an input receiving said PWM signal and first and second outputs providing first and second switching control signals to said control terminals of said first and second switches, respectively.

14. The power converter of claim 13, further comprising:

a second amplifier having inputs receiving said output voltage and a reference voltage and an output providing a voltage control signal; and wherein said comparator has a third input receiving said voltage control signal.

15. A method of averaging a piecewise linear switching current waveform of a pulse width modulation (PWM) power converter, comprising:

sampling a short duration of the current waveform at a start of each PWM cycle and providing corresponding short samples;

sampling a long duration of each PWM cycle and providing corresponding long samples;

averaging respective ones of the short and long samples and providing corresponding average values; and sampling each average value and providing a current average signal.

16. The method of claim 15, wherein each said sampling comprises coupling and charging a capacitor.

17. The method of claim 15, wherein said sampling a short duration comprises closing a first switch for a short duration and charging a first capacitor at the start of each PWM cycle, wherein said sampling a long duration of each PWM cycle comprises closing a second switch and charging a second capacitor for the duration of each PWM cycle, and wherein said sampling each average value comprises closing a third switch after each long duration and charging a third capacitor.

18. The method of claim 15, wherein the piecewise linear switching current waveform comprises ramp-on-a-step pulses, wherein said sampling a short duration comprises closing a first switch to charge a first capacitor at the beginning of each pulse, wherein said sampling a long duration of each PWM cycle comprises closing a second switch to charge a second capacitor for the duration of each pulse, and wherein said sampling each average value comprises closing a third switch and charging a third capacitor at the end of each pulse.

19. The method of claim 15, wherein said averaging respective ones of the short and long samples comprises applying the short and long samples across a resistive voltage differencing junction.

20. The method of claim 15, further comprising sensing current through switching devices of the PWM power converter and rectifying sensed current.

* * * * *